United States Patent
Sasaki et al.

(10) Patent No.: US 7,304,423 B2
(45) Date of Patent: Dec. 4, 2007

(54) EMISSIVE DISPLAY DEVICE

(75) Inventors: Susumu Sasaki, Chiba (JP); Yoshiyuki Kaneko, Hachioji (JP); Shigemi Hirasawa, Chiba (JP); Yuuichi Kijima, Chosei (JP); Kenji Miyata, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 130 days.

(21) Appl. No.: 10/365,944

(22) Filed: Feb. 13, 2003

(65) Prior Publication Data

US 2003/0160570 A1    Aug. 28, 2003

(30) Foreign Application Priority Data

Feb. 22, 2002    (JP)   .............................. 2002-046351

(51) Int. Cl.
*H01J 1/14*    (2006.01)
*G09G 3/10*    (2006.01)

(52) U.S. Cl. ...................... 313/495; 313/309; 313/310; 313/311; 313/336; 313/351

(58) Field of Classification Search ........ 313/495–497, 313/345, 346 R, 346 DC, 309–311, 336, 313/351
See application file for complete search history.

(56) References Cited

U.S. PATENT DOCUMENTS

| | | | |
|---|---|---|---|
| 5,811,916 A * | 9/1998 | Jin et al. ..................... | 313/311 |
| 6,020,677 A * | 2/2000 | Blanchet-Fincher et al. ......................... | 313/336 |
| 6,057,637 A * | 5/2000 | Zettl et al. ................... | 313/310 |
| 6,319,367 B1 | 11/2001 | Coates et al. | |
| 6,388,366 B1 * | 5/2002 | Pryor ........................ | 313/311 |
| 6,452,328 B1 * | 9/2002 | Saito et al. .................. | 313/495 |
| 6,472,802 B1 * | 10/2002 | Choi et al. ................... | 313/309 |
| 6,630,786 B2 * | 10/2003 | Cummings et al. ......... | 313/553 |
| 6,914,372 B1 * | 7/2005 | Akiyama et al. ............ | 313/309 |
| 2002/0036452 A1* | 3/2002 | Muroyama et al. ......... | 313/310 |
| 2002/0057046 A1* | 5/2002 | Yamamoto et al. ......... | 313/311 |

FOREIGN PATENT DOCUMENTS

JP    2002-501284    1/2002

OTHER PUBLICATIONS

JP 11-388058 filed Jan. 20, 1997 along with English Translation document "Field Electron Emission Materials and Devices".

* cited by examiner

*Primary Examiner*—Ashok Patel
(74) *Attorney, Agent, or Firm*—Milbank, Tweed, Hadley & McCloy LLP

(57) ABSTRACT

To obtain a paste for electron sources which can enhance heat resistance of carbon nanotubes, which can suppress burn-out of the carbon nanotubes even during heating at a high temperature, and can exhibit a high electron emission performance, boron (B) is added to the paste formed of the carbon nanotubes and metal. Due to the addition of boron, the oxidation of the carbon nanotubes can be suppressed, and the degradation of the electron emission characteristics and the degradation of the uniformity of the emission of electrons during the heating process such as baking can be prevented.

7 Claims, 6 Drawing Sheets

EMISSIVE DISPLAY DEVICE

BACKGROUND OF THE INVENTION

1. Field of the Invention

The present invention relates to a paste for electron sources for forming electron sources which emit electrons upon applying of an electric field, electron sources which use the paste for electron sources, and an emissive display device which forms the electron sources into cathode lines.

2. Description of the Related Art

As a type of field emission panel display devices (FED), there has been reported an emissive display device which uses inorganic carbon materials such as carbon nanotubes or carbon nanofibers as electron sources for emitting electrons upon applying of an electric field. For example, an example in which an emissive display device of a nominal 4.5 inch is described in pp. 1134-1137 of SID99 Digest. The electron sources of this type are formed such that, for example, a paste for electron sources which is produced by mixing carbon nanotubes (CNT) and silver (Ag) particles (paste which is produced by mixing the carbon nanotubes in a silver paste) is applied to conductive films of cathode lines by coating or printing and the paste is fixed to the conductive films by heating (baking) in the atmosphere.

However, when the inorganic carbon material paste formed of carbon nanotubes, carbon nanofibers in which silver is mixed is heated in the atmosphere at a temperature not less than 400 degree centigrade, the inorganic carbon material (also referred to as "carbon nanotubes or the like" hereinafter) is oxidized due to a catalytic action of silver and is formed into $CO_2$ (or CO) so that a major portion of the material is dissipated. Accordingly, when the inorganic carbon material is used as electron sources of a display device, the electron source cannot obtain the sufficient electron emission characteristics and it is difficult to constitute electron sources capable of uniformly emitting electrons. Further, the same tendency is recognized with respect to a paste containing other metal such as nickel (Ni) or the like other than silver to greater or lesser degrees.

Accordingly, with respect to the electron sources which are formed of the paste for electron sources which contains the carbon nanotubes or the like and metal, it is necessary to perform heating such as baking of a coating film or a printing film of the paste which is necessary in the manufacture of the display device at a temperature lower than an optimum temperature which is generally necessary in the process or under the non-oxidizing atmosphere. However, heating in the non-oxidizing atmosphere (atmosphere such as vacuum, nitrogen gas, argon gas or the like) can hardly cope with the increase of size of the panel display device due to restrictions imposed on process facilities including a heater. Further, also in baking the paste for electron sources in the non-oxidizing atmosphere, the carbon nanotubes or the like are partially dissipated due to a residual oxidizing gas or gasses generated from the process facilities and hence, the electron emission performance of the electron sources is degraded and this also constitutes one of factors which make the emission of electrons non-uniform.

As a literature which discloses a technique for forming electron sources using a paste for electron sources in which carbon nanotubes or the like and silver are mixed (CNT-Ag paste), New Emitter Techniques for Field Emission Displays written by J. M. Kim et al. (SID 01 DIGEST pp. 304-307) is known. In this literature, the above-mentioned paste for electron sources is subjected to screen printing, electron sources which are baked at a temperature of 350 degree centigrade in the atmosphere are formed, and a substrate on which the electron sources are formed and a counter substrate on which phosphors and anodes are formed is heated and sealed in an argon gas at a temperature of 415 degree centigrade.

SUMMARY OF THE INVENTION

The above-mentioned baking temperature 350 degree centigrade is a lower limit which decomposes organic binder components of the CNT-Ag paste and is set to such a value in view of the fact that heating at a temperature not less than 400 degree centigrade cannot perform in the atmosphere. However, it is desirable to perform baking at a higher temperature. Further, since a lower limit of the sealing temperature of the substrate is approximately 415 degree centigrade, the sealing is performed in the non-oxidizing atmosphere such as an argon gas or the like.

However, to ensure the sufficient conductivity in a film or the sufficient film strength of the electron sources formed of the CNT-Ag paste, it is desirable to perform baking at a temperature not less than 500 degree centigrade. Further, heating in the non-oxidizing atmosphere such as an argon gas or the like cannot realize the complete prevention of the oxidation of the carbon nanotubes or the like and constitutes one of factors which make the emission of electrons non-uniform.

Accordingly, it is an object of the present invention to provide a paste for electron sources which can reduce the dissipation of carbon nanotubes or the like even in baking at a temperature of not less than 400 degree centigrade. It is a further object of the present invention to provide an electron source which is formed of such a paste for electron sources. It is a still further object of the present invention to provide an emissive display device which includes electron sources formed of such a paste for electron sources.

To achieve the above-mentioned objects, in the present invention, boron (B) is added to a paste formed of carbon nanotubes or the like and metal. Due to an addition of boron, the oxidation of the carbon nanotubes or the like can be suppressed and hence, in a heating process such as baking or the like, it is possible to prevent the degradation of the electron emission characteristics and the degradation of the uniform electron emission performance.

Boron to be added may be boron having high reducibility in a single form, an alloy of boron or a boron oxide. The priority of oxidation is assigned to boron in a single form or an alloy of boron or the like per se and hence, the oxidation of carbon nanotubes or the like can be effectively suppressed. On the other hand, boron oxide prevents the oxidation of the carbon nanotubes or the like as a protective layer which covers dangling bonds (surface defective edges) of the carbon nanotubes, for example. Further, the enhancement of oxidation resistance of the carbon material by boron oxide is described in Japanese patent 2749175 and "Chemistry and Physics of Carbon, volume 23".

Further, since boron oxide is melted at a temperature of 450 degree centigrade, it is also possible to obtain an advantageous effect that the carbon nanotubes or the like can be fixed to metal particles. Accordingly, it is possible to prevent the carbon nanotubes or the like from being peeled off from films of electron sources which are formed by coating and baking a paste for electron sources containing the carbon nanotubes or the like and it is also possible to prevent the generation of discharge during an operation of panel display device using such electron sources. To the contrary, when the heat resistance treatment is not applied to the carbon nanotubes or the like, the carbon nanotubes or the like are burnt or are damaged in a heat treatment step of a manufacturing process of the display device thus giving rise a problem that the electron emission characteristics of the carbon nanotubes or the like is largely degraded. Typical constitutions of the present invention are enumerated hereinafter.

(1) At least metal, an alloy thereof, inorganic carbon material and boron (B) is contained in a paste for electron sources.

(2) Here, the above-mentioned boron is contained in at least one form selected from a group consisting of boron in a single form, a solid solution of boron and other metal, an intermetallic compound of boron and other metal and a compound containing boron.

(3) Further, the above-mentioned boron is contained in at least one form selected from a group consisting of boron oxide, boric acid and alkoxide of boron.

(4) Further, the above-mentioned boron is contained in at least one form selected from a group consisting of boron in a single form, a solid solution of boron and other metal, an intermetallic compound of boron and other metal and a compound containing boron, and in at least one form selected from a group consisting of boron oxide, boric acid and alkoxide of boron.

(5) The above-mentioned intermetallic compound is at least one selected from $AgB_2$, $Ni_3B$ and $Ni_2B$.

(6) Further, the above-mentioned compound which contains boron is $NaBH_4$.

(7) A content of the above-mentioned boron is approximately 0.07 to 30, preferably 0.1 to 15, more preferably 0.4 to 15 as an atomic ratio with respect to metal or alloy.

(8) A total quantity of the above-mentioned metal or alloy contained in the above-mentioned paste for electron sources amounts to not less than approximately 50 volume % of a balance excluding organic components and inorganic carbon material contained in the paste for electron sources.

(9) Further, a total quantity of the above-mentioned inorganic carbon material contained in the above-mentioned paste for electron sources amounts to approximately 0.1 to 9 as an atomic ratio with respect to a total quantity of the above-mentioned metal and alloy contained in the paste for electron sources.

(10) The above-mentioned inorganic carbon components contained in the above-mentioned paste for electron sources include at least one of carbon nanotubes or carbon nanofibers.

(11) Further, a content of the above-mentioned carbon nanotubes or carbon nanofibers is approximately not less than 1%, preferably not less than 10% as a weight % with respect to a total quantity of the above-mentioned inorganic carbon components contained in the above-mentioned paste for electron sources.

(12) As the above-mentioned metal or alloy contained in the above-mentioned paste for electron sources, at least one selected from a group consisting of silver (Ag), nickel (Ni), gold (Au), aluminum (Al), iron (Fe), copper (Cu), zinc (Zn), palladium (Pd), tungsten (W), molybdenum (Mo), tantalum (Ta), titanium (Ti), chromium (Cr) and iridium (Ir) is contained in the paste for electron sources.

(13) As the above-mentioned metal or alloy which is contained in the above-mentioned paste for electron sources, the metal or the alloy which contains at least one of Ag or Ni as a main component is used.

(14) An electron source is obtained by coating or printing the above-mentioned paste for electron sources and by heating the paste for electron sources at a temperature not less than approximately 400 degree centigrade, more preferably at temperature of not less than 450 degree centigrade so as to fix the paste for electron sources.

(15) In an emissive display device which includes cathode lines, control electrodes and anodes having phosphors, the self-luminous panel display device is further provided with the above-mentioned electron sources as the cathode lines.

In the above-mentioned paste for electron sources, by adding boron to the carbon nanotubes and the silver paste (CNT-Ag paste), for example, it is possible to suppress the dissipation of the carbon nanotubes by oxidation. With respect to boron which has the strong reducibility, the priority of oxidation is assigned to boron per se so that the oxidation of the carbon nanotubes can be suppressed. Boron oxide covers dangling bonds of the carbon nanotubes so as to suppress the oxidation of the carbon nanotubes. Accordingly, even when the carbon nanotubes are subjected to the heating process at a temperature not less than 400 degree centigrade in the atmosphere, the carbon nanotubes are not dissipated and hence, it is possible to obtain the sufficient electron emission characteristics.

Further, by adopting heating in the non-oxidizing atmosphere along with the use of boron in combination, an allowable range of a residual oxidizing gas and generating gases is large and hence, the local oxidation of the carbon nanotubes can be also prevented whereby the uniformity of the emission of electrons can be improved particularly.

Further, boron oxide is melted at a temperature of 450 degree centigrade and plays a role of fixing the carbon nanotubes to metal particles and hence, it is possible to prevent the carbon nanotubes from being peeled off from films of the formed electron sources so that the generation of discharge can be obviated.

DESCRIPTION OF THE PREFERRED EMBODIMENTS

Preferred embodiments of the present invention are explained in detail hereinafter in conjunction with drawings showing the embodiments. An example in which carbon nanotubes are used as an inorganic carbon material is explained hereinafter. A mixture obtained by mixing the carbon nanotubes in a silver paste is applied to a substrate by coating and, thereafter, the mixture is fixed by heating (baking) thus forming electron sources of a field emission type panel display device (FED). In such a manufacturing process, silver particles having an average particle size of 1 to 3 µm and the carbon nanotubes (including graphite and amorphous carbon or the like) are mixed together with a cellulose-based binder, a dispersing agent, additives and the like thus preparing a paste for electron sources.

Here, an Ag-CNT paste is prepared by adjusting an atomic ratio (C/Ag) of a quantity of inorganic carbon components (C: carbon nanotubes, graphite, amorphous carbon or the like) to silver to 1.8 (C/Ag, weight ratio 0.2). Here,as a material of the carbon nanotubes, multi-wall CNT which is manufactured by an arc discharge method in a rare gas is used.

Figure 1:
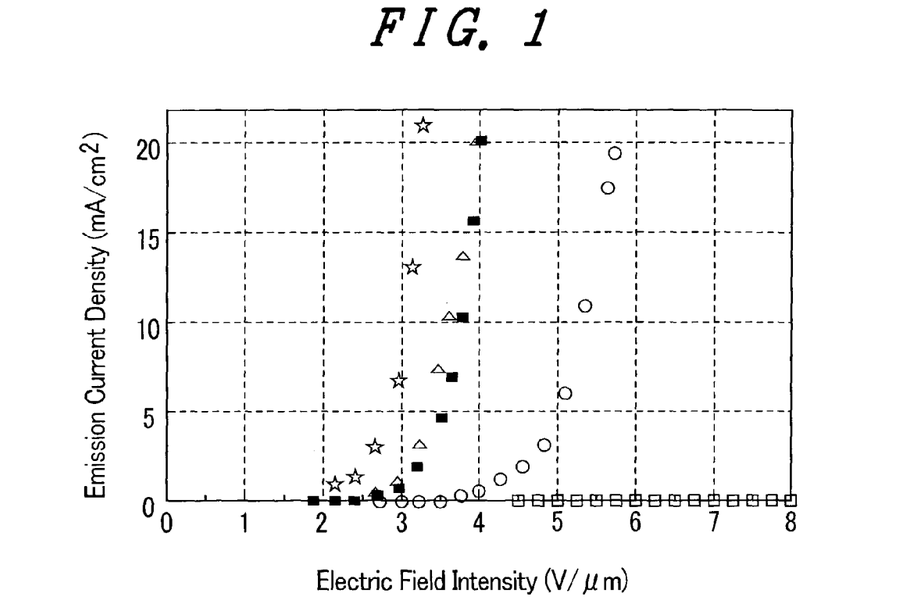
FIG. 1 is an explanatory view for explaining the electric field dependency of an emission current density which is indicated by graphs in which a change of electron emission characteristics of an Ag-CNT paste due to heating conditions and a change of similar electron emission characteristics of an Ag-CNT paste in which boron is added are plotted.

FIG. 1 is an explanatory view for explaining the electric field dependency of an emission current density which is indicated by graphs in which a change of electron emission characteristics of an Ag-CNT paste due to heating conditions and a change of similar electron emission characteristics of an Ag-CNT paste in which boron is added are plotted, wherein an electric field intensity (V/µm) is taken on an axis of abscissas and an emission current density (mA/cm$^2$) is taken on an axis of ordinates. In the drawing, a graph indicated by a white triangle Δ shows a case in which the Ag-CNT paste is baked in the atmosphere at a temperature of 350 degree centigrade, a graph indicated by a white circle ○ shows a case in which the Ag-CNT paste is baked in the atmosphere at a temperature of 450 degree centigrade, a graph indicated by a white square □ shows a case in which the Ag-CNT paste is baked in the atmosphere at a temperature of 590 degree centigrade, a graph indicated by a black square ■ shows a case in which the Ag-CNT paste is baked in the atmosphere at a temperature of 590 degree centigrade, and a graph indicated by a white star ☆ shows a case in which the Ag—B-CNT paste is baked in the atmosphere at a temperature of 590 degree centigrade.

To achieve these graphs, the Ag-CNT paste having a large film thickness is printed on a surface of a glass substrate within a region of 3 by 3 mm square and is baked respectively at a temperature of 350 degree centigrade, 450 degree centigrade and 590 degree centigrade in the atmosphere to produce baked films which constitute samples. An anode is arranged in front of the baked film which constitutes the sample with a distance of 400 µm therebetween and the electron emission characteristics are measured.

As shown in respective graphs indicated by the white triangle Δ, the white circle ○ and the white square □, the higher the baking temperature, an electric field necessary for emission of electrons is increased (the emission of electron becomes more difficult), and the emission of electrons can not be obtained even with a high electric field having an electric field intensity of 8 V/µm in baking at a temperature of 590 degree centigrade. However, when the same paste is baked in the nitrogen atmosphere at a temperature of 590 degree centigrade, the emission of electrons of approximately 20 mA/cm$^2$ is obtained at an electric field intensity of approximately 4 V/µm.

The reason that the sufficient emission of electrons is not obtained or the emission of electron is not obtained at all in the atmosphere at a high temperature is that due to heating in the oxidizing atmosphere, carbon such as carbon nanotubes or the like are oxidized and dissipated in a form of carbonic acid gas. However, when only the carbon nanotubes which are used in the paste are heated at a temperature of 600 degree centigrade, the carbon nanotubes are hardly dissipated by burning. This is because that silver works as an oxidation catalyst and promotes the oxidation of the carbon nanotubes. Accordingly, unless the paste of the carbon nanotubes does not contain Ag (or other metal having an oxidation catalytic action), the carbon nanotubes can withstand the heating in the atmosphere at not less than 400 degree centigrade.

However, from a viewpoint of ensuring the conductivity of the electron source using the carbon nanotubes (CNT) and a film strength of the electron source, it is desirable that Ag (Ag particles or other metal particles) is contained in the paste of the carbon nanotubes. Further, even in the paste of the carbon nanotubes containing metal which acts as an oxidation catalyst, it is possible to suppress the oxidation of the carbon nanotubes provided that heating is performed in the nitrogen atmosphere (or other non-oxidizing atmosphere). However, it is not appropriate to realize the above-mentioned baking treatment in such a non-oxidizing atmosphere in the manufacturing process of a large-sized substrate of a nominal diagonal 40 inch class.

The fact that metal which has an oxidation catalytic action such as Ag promotes the oxidation (burn-out) of the carbon nanotubes is common in all carbon-based materials and a similar oxidation promoting phenomenon is observed with respect to multi-wall CNT, single-wall CNT, graphite, diamond-like carbon, amorphous carbon and the like. As a technique which prevents the oxidation of carbon, a technique to cover dangling bonds on a surface of carbon with B—O (boron-oxygen) is described in JP 1991-271184A and page 208, Third chapter, Volume 23 of Chemistry and Physics of Carbon.

Embodiments of the present invention are explained hereinafter in view-of the above fact.

Embodiment 1

An Ag—B-CNT paste is prepared by adding boron B to an Ag-CNT paste such that an atomic ratio B/Ag becomes 0.8 (B/Ag weight ratio: 0.08). Here, the atomic ratio means a ratio between the numbers of respective atoms. Boron in a single form is used as a boron adding material. When the Ag—B-CNT paste is heated (baked) in the atmosphere at a temperature of 590 degree centigrade, as indicated by the white star in FIG. 1, the emission of electrons of 20 mA/cm$^2$ is obtained at an electric field intensity of approximately 3V/µm. In this manner, when boron is added, it is possible to realize the emission of electrons even when the paste is heated in the atmosphere at a temperature of 590 degree centigrade and, at the same time, the further enhanced electron emission characteristics can be obtained compared to a case that an Ag-CNT paste to which boron is not added is heated in an nitrogen atmosphere.

Figure 2A:
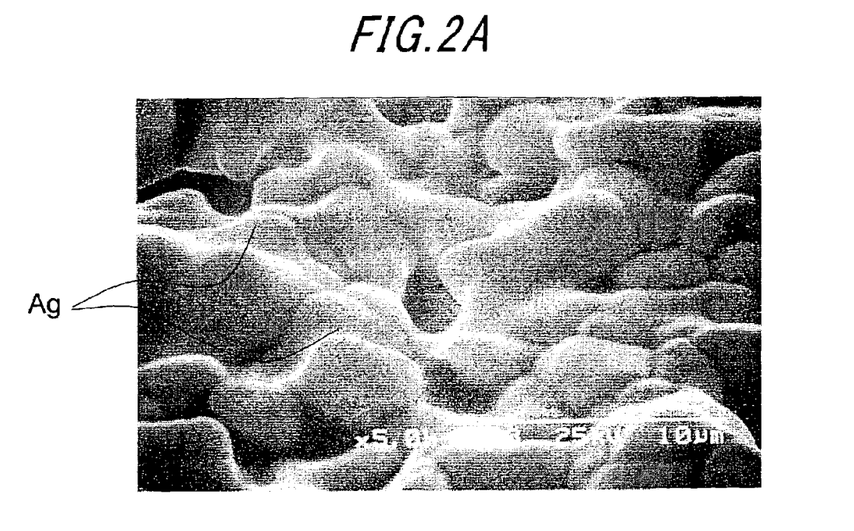
FIG. 2A and FIG. 2B are scanning electron microscope photographs of films of electron sources which are obtained by baking respectively the Ag-CNT paste and the Ag—B-CNT paste in the atmosphere at a temperature of 590 degree centigrade.
Figure 2B:
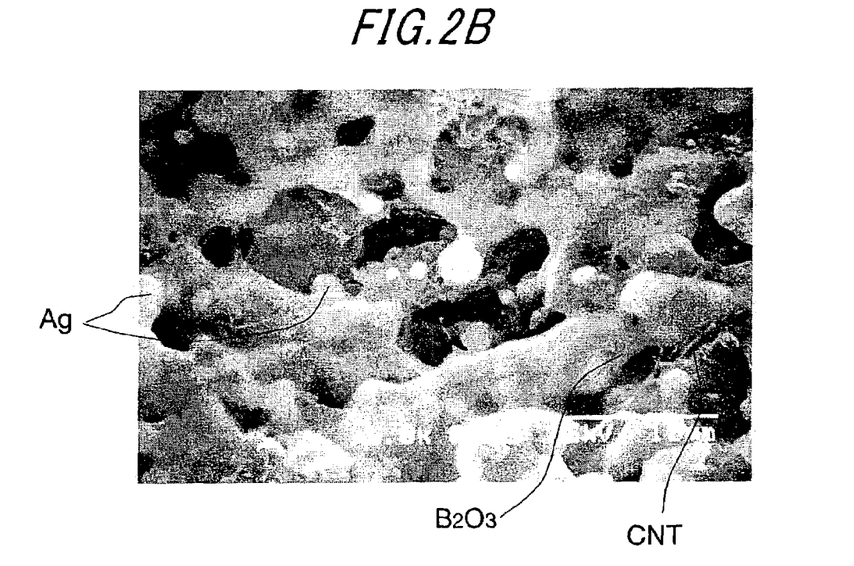

FIG. 2A and FIG. 2B are scanning electron microscope photographs of films of electron sources which are obtained by respectively baking an Ag-CNT paste and an Ag—B-

CNT paste in the atmosphere at a temperature of 590 degree centigrade. That is, FIG. 2A is a baked film of the Ag-CNT paste and FIG. 2B is a baked film of the Ag—B-CNT paste. In FIG. 2A, carbon nanotubes are dissipated and only silver particles remain. Portions formed in a cocoon shape in FIG. 2A are silver (Ag) particles. To the contrary, in FIG. 2B, carbon nanotubes CNT which remain without being oxidized are present between silver particles. In FIG. 2B the carbon nanotubes (CNT) having a fiber shape are observed. Here, in FIG. 2B, boron oxide ($B_2O_3$) is present such that the boron oxide connects the cocoon-shaped silver (Ag) particles.

Experiments similar to this embodiment are performed with respect to Ag-CNT which uses single-wall CNT and multi-wall CNT prepared by a thermal CVD method. Also in these experiments, it is confirmed that the oxidation and the burn-out of the carbon nanotubes can be suppressed by the addition of boron and the favorable electron emission characteristics can be obtained even with heating in the atmosphere.

[Experiment 2]

Figure 3:
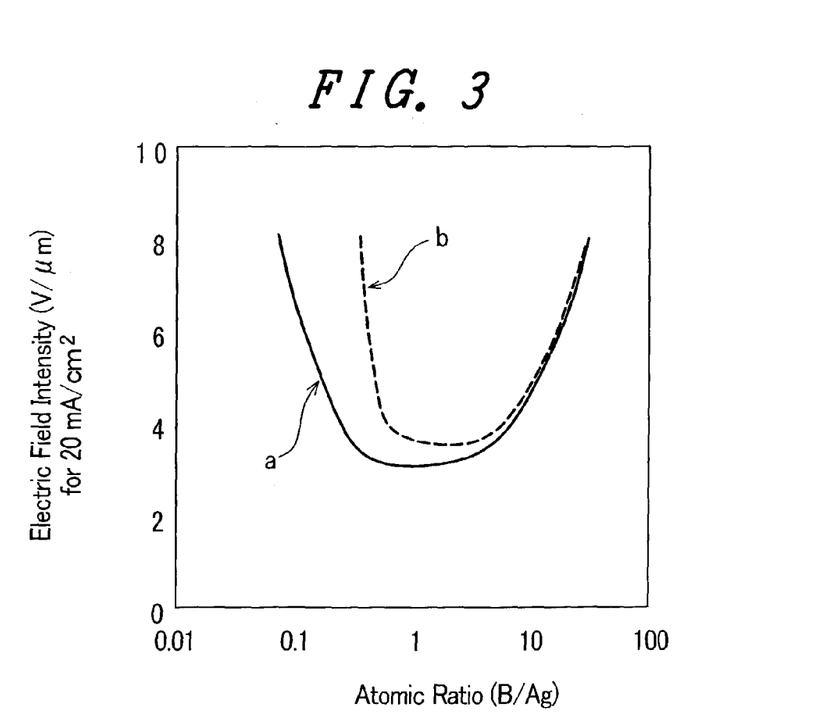
FIG. 3 is an explanatory view for explaining the boron quantity dependency of an electric field of the Ag—B-CNT paste necessary for emitting electrons.

FIG. 3 is an explanatory view for explaining the boron quantity dependency of an electric field of the Ag—B-CNT paste necessary for emitting electrons. In FIG. 3, the Ag—B-CNT pastes are prepared by changing a quantity of boron B within a range of 0.05 to 50 as an atomic ratio of B/Ag (B/Ag weight ratio: 0.005 to 5). A case in which boron in a single form is used as a boron adding material and a case in which boron oxide ($B_2O_3$) is used as a boron adding material are indicated. Printing films formed of these pastes for electron sources are heated (baked) in the atmosphere at a temperature of 590 degree centigrade and, thereafter, electric fields which can obtain the emission of electrons of 20 mA/cm² are measured. A result of the measurement is shown in FIG. 3.

When boron in a single form is added, the emission of electrons is obtained at an electric field having an electric field intensity of not more than 8V/μm when the B/Ag atomic ratio falls in a range of 0.07 to 30 and the emission of electrons is not observed except for this range even when the electric field intensity is 10V/μm (see a solid line a in FIG. 3). This implies that when an addition quantity of boron is small, the anti-oxidation and protective effect become insufficient, while when an addition quantity of boron is excessively large, boron excessively covers a surface of a film and hence, the electron emission characteristics is lowered. When boron oxide is used as the boron adding material, the emission of electrons is obtained when the B/Ag atomic ratio falls in a range of 0.35 to 30 (see a broken line b in FIG. 3). From these results, it is understood that the boron adding effect can be obtained at least in these composition ranges (B/Ag atomic ratio).

Here, in a field emission type panel display device (FED), it is preferable that a driving voltage which is served for allowing electron sources to generate electrons is as small as possible and the driving voltage of not more than approximately 150V is desirable. Provided that the driving voltage is held at such a level, an existing driving circuit which can be obtained at a low cost is available. Here, when en electron source made of carbon nanotubes which is formed by printing is used, a distance from the electron source to a gate electrode for pulling out electrons is approximately 25 μm. (It is difficult to form or arrange the electron source with accuracy when the distance is below 25 μm.)

Accordingly, to set the driving voltage to a value not more than 150V, it is necessary to obtain a desired electric current density at an electric field having an electric field density of not more than 6V/μm (=150V/25 μm). The required electric current density must be 5 to 10 mA/cm² as an electric current density on a phosphor screen from a viewpoint of light emission luminance. However, in view of the necessity to build up a gate electrode structure, an effective electron source area is restricted to not more than one half of a substrate on which the electron sources are formed. Therefore, it is necessary to ensure the electric current density of 10 to 20 mA/cm² at the electron sources. Accordingly, as the characteristics of the electron sources which use the carbon nanotubes, it is desirable that the electric current density of approximately 20 mA/cm² is obtained in the electric field having an electric field intensity of not more than 6 V/μm. The composition range in which this characteristics can be obtained is approximately 0.1 to 15 as the atomic ratio of B/Ag when boron is added in a single form and is approximately 0.4 to 15 as the atomic ratio of B/Ag when boron is added in a form of boron oxide.

The reason that boron in a single form has a larger oxidation prevention effect than boron oxide even at a low concentration is attributed to a double protective effect that boron in a single form exhibits. That is, boron in a single form per se is preferentially oxidized compared to carbon so that the oxidation of the carbon nanotubes is suppressed. At the same time, boron is formed into boron oxide and is absorbed into a surface of carbon nanotubes thus forming a protective layer.

However, boron (in a single form) is easily oxidized and has hygroscopicity and hence, even when boron is added into the paste as boron in a single form, there is a high possibility that some boron oxide (or boric acid) is present in the paste in a strict sense so that there arises irregularities in the boron addition effect. Accordingly, to surely achieve the reliable reproducibility of the boron addition effect in the application of boron to the electron source for FED, even when boron is added in a single form, it is preferable to adjust the composition range to 0.4 to 15 as the atomic ratio of B/Ag when boron is added as boron oxide.

When the intermetallic compound with silver, hydroxide boron sodium ($NaBH_4$), boric acid ($H_3BO_3$) or alkoxide such as $B(OCH_3)_3$ is used as the boron adding material, it is possible to obtain electron emission characteristics equal to the electron emission characteristics of boron in a single form or of boron oxide, or the intermediate electron emission characteristics thereof. With respect to the intermetallic compound and the hydroxide boron sodium, in the same manner as boron per se, first of all, boron per se in these compounds is oxidized so as to suppress the oxidation of the carbon nanotubes and, thereafter, boron is formed into boron oxide to form a protective layer which covers the carbon nanotubes. Boric acid and alkoxide are decomposed and are formed into boron oxide by heating and perform functions in the same manner as the case where boron oxide is added.

Figure 4:
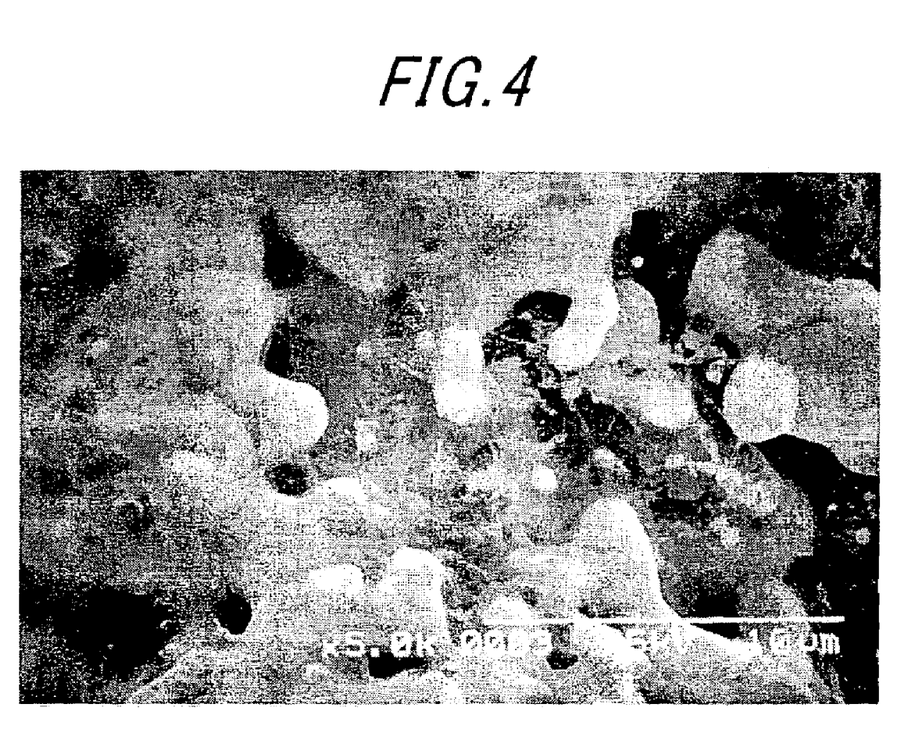
FIG. 4 is a scanning electron microscope photograph showing a surface of an electron source film (Ag—B-CNT film) after baking the Ag—B-CNT paste in the atmosphere at a temperature of 590 degree centigrade twice.

FIG. 4 is a scanning electron microscope photograph of a surface of an electron source film (Ag—B-CNT film) after baking an Ag—B-CNT paste twice in the atmosphere at a temperature of 590 degree centigrade. When the carbon nanotubes (CNT) are protected with boron oxide once, even when the paste is subjected to heating in the atmosphere again, boron oxide maintains a protective effect. In the scanning electron microscope photograph of the Ag—B-CNT film obtained after performing heating again in the atmosphere at a temperature of 590 degree centigrade, the carbon nanotubes are explicitly observed in a fiber pattern in the drawing. Further, the degradation of the electron emission characteristics cannot be also observed. This implies that the Ag—B-CNT paste exhibits resistance not only in the baking process of the printing paste but also in the heating process of manufacturing of the FED panel which follows the baking process. Accordingly, it is possible to expect the remarkable enhancement of a yield rate of the panel manufacturing and the reliability of products.

Embodiment 3

Figure 5A:
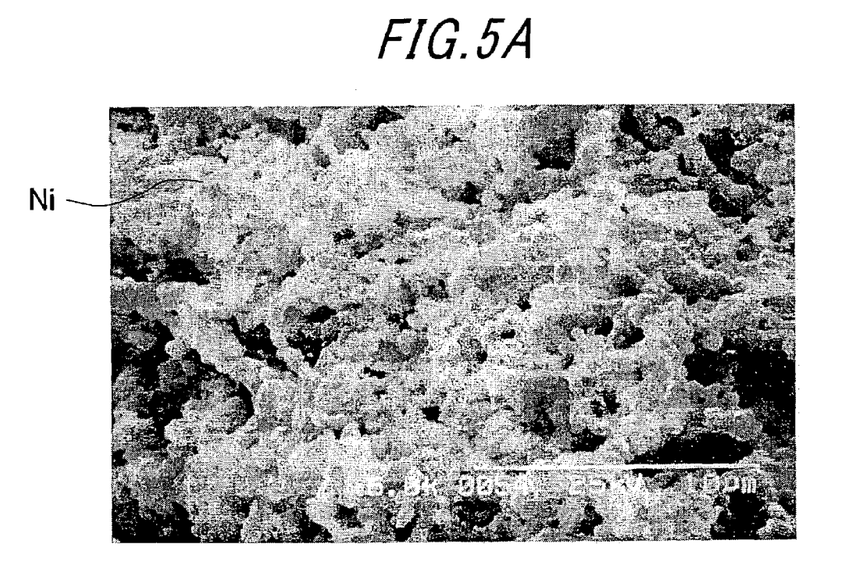
FIG. 5A and FIG. 5B are scanning electron microscope photographs for comparing surfaces of Ni-CNT and Ni—B-CNT after heating them at a temperature of 590 degree centigrade in the. atmosphere.
Figure 5B:
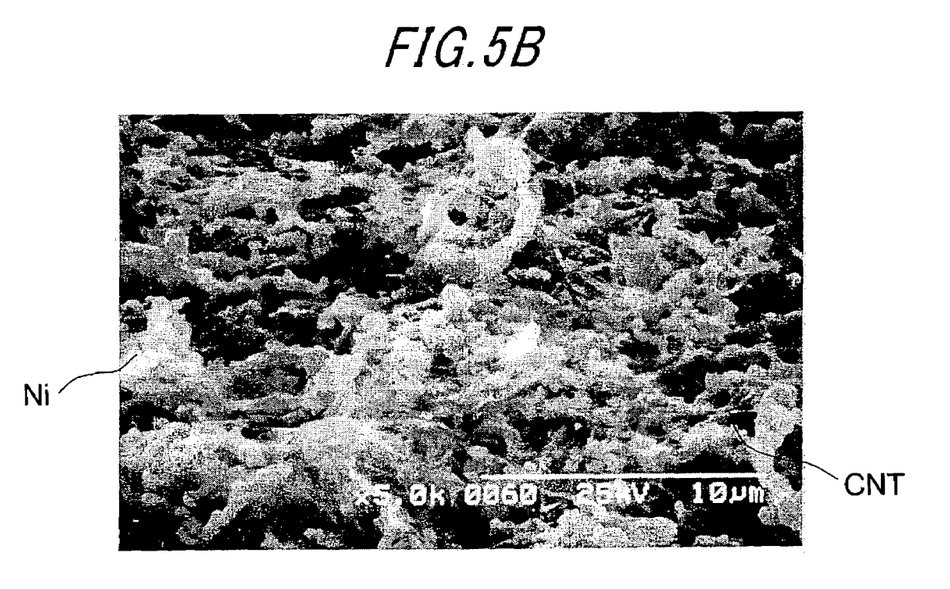

FIG. 5A and FIG. 5B are scanning electron microscope photographs served for comparing surfaces of an Ni-CNT paste and an Ni—B-CNT paste after baking them in the atmosphere at a temperature of 590 degree centigrade. That is, FIG. 5A is a baked film of the Ni-CNT paste and FIG. 5B is a baked film of the Ni—B-CNT paste. The Ni—B-CNT paste is prepared in the same manner as the embodiment 1. Nickel (Ni) having an average particle size of approximately 1 μm is used and the compound ranges are respectively adjusted to an atomic ratio of 1.2 (weight ratio: 0.25) as C/Ni and to an atomic ratio of 0.45 (weight ratio 0.09) as B/Ni. The Ni—B-CNT paste and the Ni-CNT paste which does not contain boron are heated (baked) in the atmosphere at a temperature of 590 degree centigrade. As a result, with respect to the Ni—B-CNT paste, it is confirmed that carbon nanotubes (CNT) remain in a fiber pattern as shown in FIG. 5B. Accordingly, in the same manner as the paste which uses the silver particles, the paste which uses nickel particles can prevent the oxidation of the carbon nanotubes by the addition of boron.

In general, metal and oxide thereof function as oxidation catalysts in many cases. Accordingly, in a paste in which other metal and carbon nanotubes (or other inorganic carbon component) are mixed, boron performs the similar advantageous effect. According to a result obtained by reviewing gold (Au), aluminum (Al), iron (Fe), copper (Cu), zinc (Zn), palladium (Pd), tungsten (W), molybdenum (Mo), tantalum (Ta), titanium (Ti), chromium (Cr) and iridium (Ir), boron exhibits a similar advantageous effect as in the case of silver and nickel. Further, it is also evident that a similar advantageous effect can be obtained when these metals are used in mixture.

Figure 6:
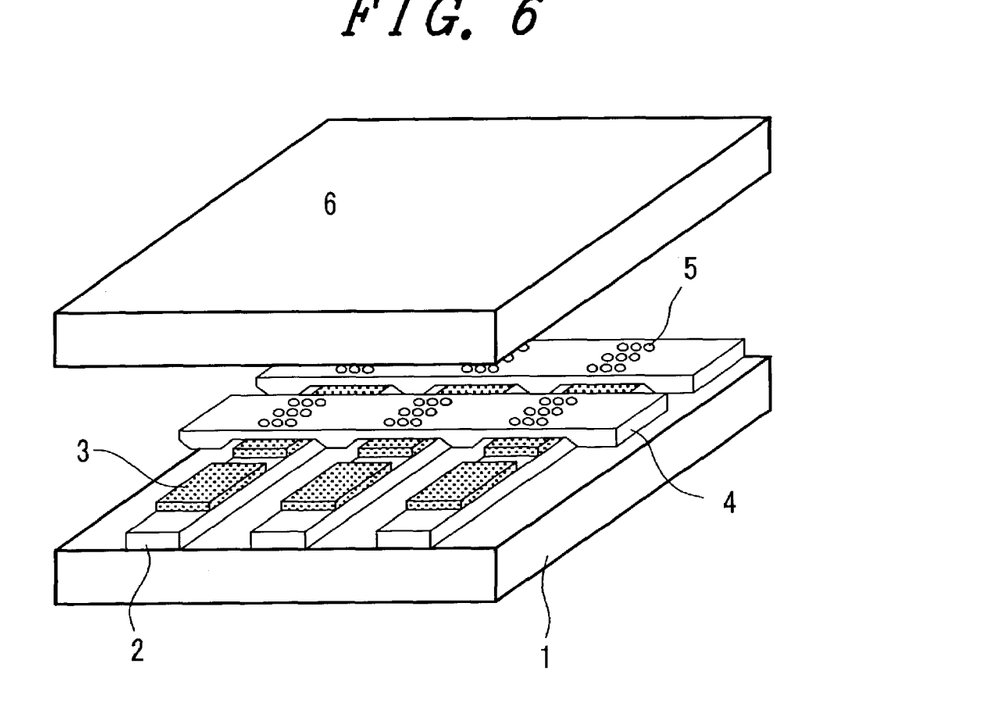
FIG. 6 is a developed perspective view of an essential part for explaining a constitutional example of an electric field emission display device according to the present invention.

FIG. 6 is a developed perspective view of an essential part for explaining a constitutional example of an electric field type display device according to the present invention. In the drawing, numeral 1 indicates an electron-source side substrate, numeral 2 indicates electron source lines (cathode lines), numeral 3 indicates electron sources formed of Ag—B-CNT, numeral 4 indicates metal grids (control electrodes), numeral 5 indicates opening portions (electron passing holes) formed in the metal grid electrodes, and numeral 6 indicates a phosphor-screen side substrate which is provided with anodes and phosphors on an inner surface thereof. In this embodiment, the Ag—B-CNT paste of the example 1 is used. First of all, the electron source lines 2 are formed on the electron-source side substrate 1 by printing and baking the silver paste. The Ag—B-CNT paste which constitutes the electron sources is printed on upper surfaces of the electron-source lines 2. The Ag—B-CNT paste is baked in the atmosphere at a temperature of 590 degree centigrade to form the electron sources and, thereafter, the metal grid electrodes 4 which have the opening portions 5 are arranged in an overlapped manner.

Glass frit (not shown in the drawing) is used for fixing the grid electrodes 4 to the inner surface of the electron-source side substrate 1. For fixing the metal grid electrodes 4 using this glass frit, heating is performed in the atmosphere at a temperature of 450 degree centigrade. A distance between lower ends of the opening portions 5 of the metal grid electrodes 4 and a surface of the Ag—B-CNT is set to approximately 25 μm.

Figure 7:
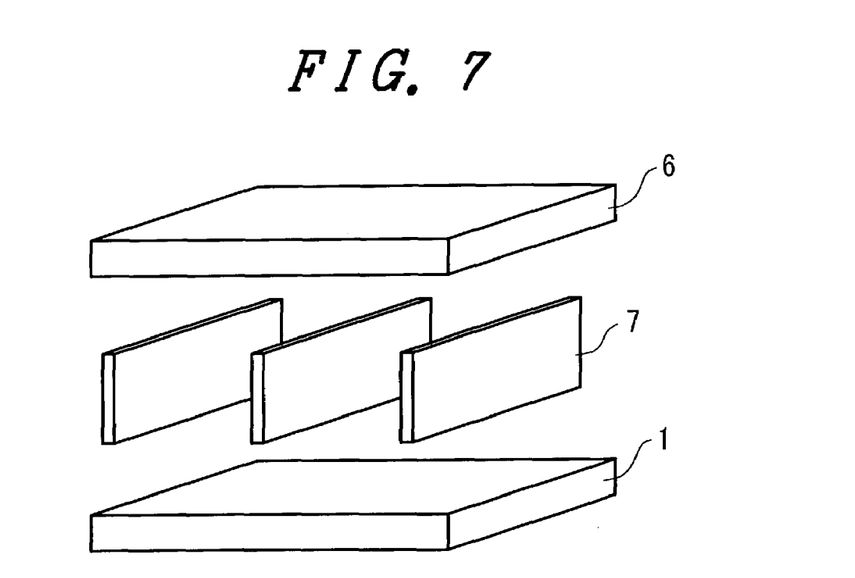
FIG. 7 is a schematic perspective view for explaining an example of a holding structure for holding an electron-source side substrate and a phosphor-screen side substrate at a given distance.

Further, FIG. 7 is a schematic perspective view for explaining one example of the holding structure for holding a distance between the electron-source side substrate 1 and the phosphor-screen side substrate 6 at a given one. Partition walls (or spacers) 7 are interposed between the electron-source side substrate 1 on which the above-mentioned electron source lines 2, the electron sources 3 and the metal grid electrodes 4 are formed and the phosphor-screen side substrate 6, and peripheries of both substrates 1, 6 are sealed by a glass frame (not shown in the drawing) and glass frit (not shown in the drawing). This sealing is performed in the atmosphere at a temperature of 430 degree centigrade. Thereafter, a space defined between both substrates 1, 6 is evacuated while being heated at a temperature of 350 degree centigrade and is held in vacuum by sealing.

Figure 8:
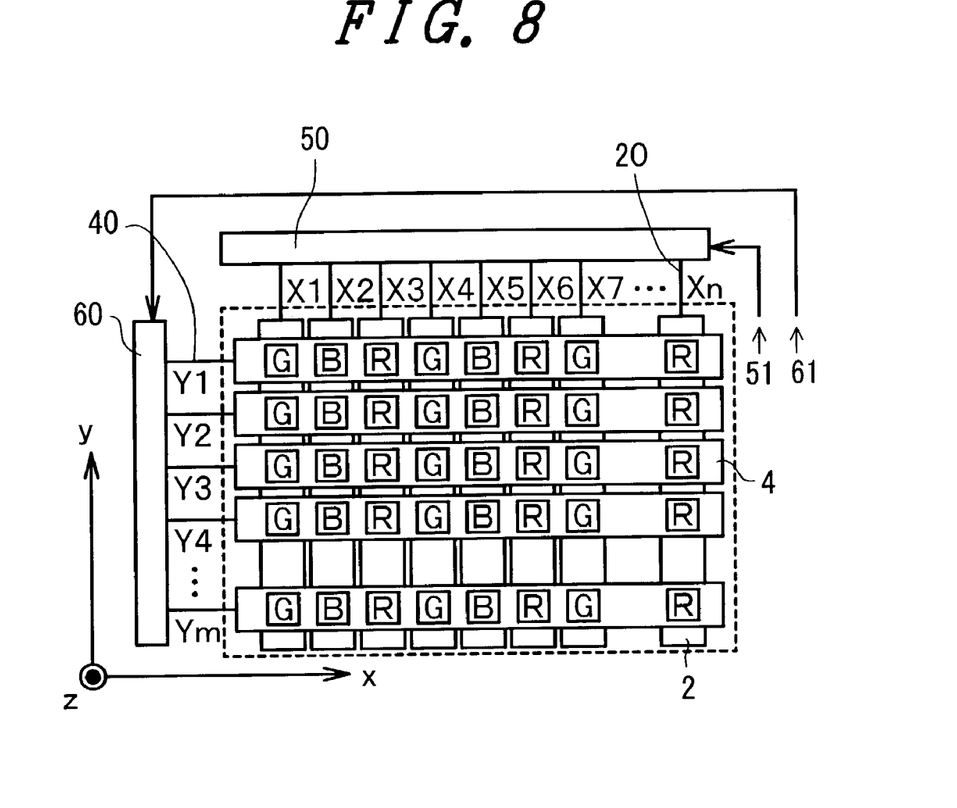
FIG. 8 is an equivalent circuit for explaining one example of a driving method of the display device according to the present invention.

FIG. 8 is an equivalent circuit for explaining one example of a driving method of the display device according to the present invention. In this display device, n pieces of electron source lines (cathode lines) 2 which extend in the y direction are arranged in parallel in the x direction. Further, m pieces of control electrodes (metal grids) 4 which extend in the x direction are arranged in parallel in the y direction thus constituting a matrix of m lines×n columns together with the cathode lines 2.

A scanning circuit 60 and a video signal circuit 50 are arranged in the periphery of the electron-source side substrate which constitutes the display device. Respective control electrodes 4 are connected to the scanning circuit 60 through control electrode terminals 40 (Y1, Y2, . . . Ym). Then, respective cathode lines 2 are connected to the video signal circuit 50 through cathode terminals 20 (X1, X2, . . . Xn).

For each pixel at the crossing portions of the cathode lines 2 and the control electrodes 4 which are arranged in a matrix array, any one of electron sources which are formed by coating and baking the carbon nanotube paste containing boron which has been explained in the previous embodiments is provided. Here, in the above-mentioned embodiment, although the explanation has been made such that one electrode source is provided for one pixel in each cross section, the number of pixels is not limited to the above case. That is, two or more pixels can be arranged within one pixel region. R, G, B in the drawing are monochroic pixels of red (R), green (G), blue (B) which respectively constitute respective color pixels, wherein lights corresponding to respective colors are emitted from phosphors.

Various types of signals for display are applied to the scanning circuit 60 and the video signal circuit 50 from a host computer not shown in the drawing. Synchronous signals 61 are inputted to the scanning circuit 60. The scanning circuit 60 selects a line of the matrix of the control electrodes 4 through the control electrode terminals 40 and applies a scanning signal voltage to the selected control electrode 4.

On the other hand, video signals 51 are inputted to the video signal circuit 50. The video signal circuit 50 is connected to the cathode lines 2 through cathode terminals 20 (X1, X2, . . . Xn), a column of the matrix is selected and then a voltage corresponding to the video signal 51 is applied to the selected cathode line. Accordingly, given pixels which are sequentially selected by the control electrodes 4 and the cathode lines 2 emit lights of given colors so as to display a two-dimensional image.

With the use of the display device which adopts the carbon nanotubes according to this embodiment as electron sources, it is possible to realize a bright FED display device which is operated at a relatively low voltage and with high efficiency without display irregularities.

As has been described above, the Ag—B-CNT paste of this embodiment can be baked in the atmosphere at a sufficiently high temperature (590 degree centigrade) and hence, the electron sources 3 formed of Ag—B-CNT have a sufficient strength and the sufficient conductivity. Further, even when the Ag—B-CNT paste is subjected to the subsequent heating process, there is no possibility that the carbon nanotubes are oxidized (burn out) and hence, it is possible to obtain the sufficient emission of electrons. In this FED display device, when 7 kV is applied to the anodes formed on the inner surface of the phosphor-screen side substrate 6 and the FED display device is operated with a grid voltage of 100V (driving at 60 Hz), the luminance of 500 cd/m$^2$ which is sufficient for this type of display device is obtained.

To the contrary, when the display device is prepared by the same manufacturing process as described above using the conventional Ag-CNT paste, the emission of light is hardly obtained. With respect to the Ag-CNT paste, to suppress the oxidation of the carbon nanotubes, a case in which the baking temperature of the paste is set to 350 degree centigrade is also tested. Also in this case, since the Ag-CNT paste has to pass another heating process which is performed at a temperature of 450 degree centigrade and hence, the electron source film is degraded whereby the luminance is approximately one half of the luminance which is obtained when the Ag—B-CNT paste is used under the same driving conditions. Further, although all heating processes in the manufacturing of FED are performed using a device which can replace the atmosphere with the nitrogen atmosphere, the luminance is apparently reduced compared to a case in which the display device is prepared through the heating process in the atmosphere using the Ag—B-CNT paste. This suggests that in the heating processes for assembling the FED, the generation of gasses from respective constitutional materials and the manufacturing equipment or jigs is unavoidable and hence, it is difficult to maintain the complete non-oxidizing atmosphere.

Here, in a case that the Ag—B-CNT paste is used as the electron sources, when the baking and the succeeding heating process are performed in the nitrogen atmosphere, a phenomenon in which the uniformity of emission of light is further enhanced is obtained. This may be attributed to a fact that the carbon nanotube protection effect brought about by the addition of boron and the protection effect brought about by heating under the non-oxidizing atmosphere are superposed and hence, it was possible to suppress not only the macroscopic oxidation and burn-out of the carbon nanotubes but also the microscopic local oxidation of the surface of carbon nanotubes.

In this manner, when the Ag—B-CNT paste of this embodiment is used for producing the electron sources, it is possible to manufacture the FED having the sufficient performance even during the heating processes in the atmosphere and hence, it is possible to provide the display device having high quality at a low cost. Further, by using this provision in combination with the heating process under the non-oxidizing atmosphere such as nitrogen, the uniformity of emission of light is further enhanced. Accordingly, it is possible to realize a display exhibiting high definition and high display quality.

Here, the execution of the heating process in the completely non-oxidizing atmosphere which is considered as an alternative for a case in which boron is not added is extremely difficult due to gasses generated from the constitutional members. Accordingly, it is reasonable to state that the addition of boron into the electron sources using the carbon nanotubes is inevitable in the FED technique which uses the carbon nanotubes as the electron sources. The present invention includes not only the paste for electron sources which includes boron but also the electron sources which are manufactured using the paste and the display device provided with these electron sources.

Further, although it is a soconary effect, according to the present invention, an advantageous effect that an inner discharge of the FED display device is prevented is obtained. The reason is considered that boron oxide is melted at a temperature of approximately 450 degree centigrade and hence, the carbon nanotubes and the metal particles are fixed to each other. Accordingly, the rupture of panel attributed to discharge can be suppressed so that the reliability of the FED display device is enhanced.

Here, in the above-mentioned embodiments of the present invention, the case in which the carbon nanotubes CNT (multi-wall CNT and single-wall CNT, also including carbon nanofibers in a broad definition) is used as the electron emission material has been explained. However, the present invention can obtain the same advantageous effects so long as the electron emission material is an inorganic carbon material. As the inorganic carbon material other than carbon nanotubes, for example, diamond, diamond-like carbon, graphite or amorphous carbon can be used. The mixture of these materials can be also used as the electron emission material. However, the carbon nanotubes are the excellent electron emission material among the carbon materials and hence, it is preferable that the carbon nanotubes amount to not less than 1%, preferably not less than 10% in the inorganic carbon components.

Further, the metal paste contains an inorganic binder such as glass besides metal in many cases. However, in this case, to make the metal paste exhibit the sufficient conductivity, the composition of metal paste is adjusted in general such that metal occupies not less than one half of the volume of the metal/inorganic binder composition. Also in the present invention, it is preferable that a quantity of metal component is larger than a quantity of inorganic binder component.

Further, in the embodiment of the present invention, a step in which boron was adds after preparation of a mixed paste of metal and carbon nanotubes is adopted to add boron. However, it is needless to say that the metal component is added after preliminarily performing the mixing treatment of boron with the carbon nanotubes and the inorganic carbon component, or all of these components are simultaneously mixed with each other.

Further, it is needless to say that the present invention is not limited to the constitution of the above-mentioned embodiments, the subject to which the present invention is applicable is not limited to the FED and various modifications can be made within a scope of the technical concept of the present invention.

As has been explained heretofore, according to the present invention, the heat resistance of the paste in which the carbon nanotubes are mixed can be enhanced with the addition of boron. Particularly, it is not necessary to perform the electron-source baking step and the substrate sealing step in the manufacturing process of the FED in the non-oxidizing atmosphere and hence, it is possible to use a general heating furnace (or a baking furnace) whereby the reduction of a manufacturing cost can be achieved. Further, by adopting heating or baking in the non-oxidizing atmosphere in combination with the addition of boron, the uniformity of emission of electrons can be further enhanced so that it is possible to provide the display device of high quality. Further, since a high voltage is applied to the phosphor screen in the FED, when the carbon nanotubes are scattered and are adhered to portions other than given positions, this may generate a discharge and there is a possibility that the display device receives a damage. According to the electron sources of the present invention, since the carbon nanotubes are hardly scattered and hence, such a possibility can be drastically reduced thus enhancing there liability of the display device.

What is claimed is:

1. An emissive display device comprising cathode lines having electron source film, control electrodes and an anode having phosphors, wherein the electron source film includes a particles formed of at least one of a metal and an alloy thereof, an electron source formed of inorganic carbon material, and boron oxide, and
the inorganic carbon material exists between the metal or alloy particles, and the boron oxide connects the metal or alloy particles.

2. An emissive display device according to claim 1, wherein a content of the boron is approximately 0.07 to 30 as an atomic ratio with respect to metal or alloy.

3. An emissive display device according to claim 1, wherein the inorganic carbon material includes a carbon nanostructure formed of at least one of carbon nanotubes and carbon nanofibers.

4. An emissive display device according to claim 3, wherein a content of the carbon nanostructure is approximately not less than 1% as a weight % with respect to a total quantity of the inorganic carbon material.

5. An emissive display device according to claim 1, wherein the particle includes at least one element selected from a group consisting of Ag, Ni, Au, Al, Fe, Cu, Zn, Pd, W, Mo, Ta, Ti, Cr and Ir.

6. An emissive display device according to claim 1, wherein the particle contains at least one of Ag and Ni as a main component.

7. An emissive display device according to claim 1, wherein the electron source film is fixed by coating or printing a paste for electron sources and by heating the paste for electron sources at a temperature not less than approximately 400 degree centigrade.

* * * * *